US007064273B1

(12) United States Patent
Kiely

(10) Patent No.: US 7,064,273 B1
(45) Date of Patent: Jun. 20, 2006

(54) ELECTRICAL CONNECTOR WITH CONICAL SPLIT SNAP RING RETAINER

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/180,085

(22) Filed: Jul. 13, 2005

Related U.S. Application Data

(63) Continuation-in-part of application No. 11/028,373, filed on Jan. 3, 2005.

(60) Provisional application No. 60/587,121, filed on Jul. 12, 2004.

(51) Int. Cl.
*H02G 3/06* (2006.01)

(52) U.S. Cl. .............. 174/65 R; 174/84 R; 174/153 R; 439/142

(58) Field of Classification Search .............. 174/65 R, 174/84 R, 153 R, 68.1, 71 R, 68.3, 70 R, 174/65 SS; 439/142, 557, 552
See application file for complete search history.

(56) References Cited

U.S. PATENT DOCUMENTS 1,483,218 A 2/1924 Fahnestock
1,725,883 A 8/1929 Recker
1,830,250 A 11/1931 Tiefenbacher
2,156,003 A 4/1939 Tinnerman
2,160,353 A 5/1939 Conners
2,445,663 A 7/1948 Peters
2,744,769 A 5/1956 Roeder et al.
2,823,932 A 2/1958 Schigut
3,183,297 A 5/1965 Curtiss
3,436,105 A 4/1969 Miklya
3,544,705 A 12/1970 Winston
3,631,738 A 1/1972 Harper
3,788,582 A 1/1974 Swanquist
3,814,467 A 6/1974 Van Buren, Jr.
3,858,151 A 12/1974 Paskert
3,993,333 A 11/1976 Biswas
4,012,578 A 3/1977 Moran et al.
4,021,604 A 5/1977 Dola et al.
4,032,178 A 6/1977 Neuroth
4,159,405 A 6/1979 Semonchik et al.
4,361,302 A 11/1982 Lass
4,453,059 A 6/1984 Fukushima
4,468,535 A 8/1984 Law
4,619,332 A 10/1986 Sheehan
4,621,166 A 11/1986 Neuroth
4,626,620 A 12/1986 Plyler
4,657,212 A 4/1987 Gilmore et al.

(Continued)

*Primary Examiner*—Dhiru R. Patel
(74) *Attorney, Agent, or Firm*—Fattibene & Fattibene; Arthur T. Fattibene; Paul A. Fattibene

(57) ABSTRACT

A connector assembly for securing an electrical conductor to an electric box which includes a metallic connector body having an inlet end portion and an outlet end portion with a frustro-conical snap fit retainer ring circumscribing the outlet end portion of the connector body. The frustro-conical, snap fit, retainer ring is formed from an elongated blank of spring steel material having integrally blanked out of the plane thereof a series of holding tangs bent outwardly from the plane of the ring with one or more grounding tangs disposed in co-planar relationship relative to the surface of the frustro-conical ring, whereby the outlet end of the connector assembly can be readily inserted through a knock-out hole of an electric box for securely locking the connector assembly to an electric box and insuring a positive electrical grounding effect.

4 Claims, 3 Drawing Sheets

U.S. PATENT DOCUMENTS

| | | | | |
|---|---|---|---|---|
| 4,711,472 | A | 12/1987 | Schnell | |
| 4,773,280 | A | 9/1988 | Baumgarten | |
| 4,880,387 | A | 11/1989 | Stikeleather et al. | |
| 4,981,310 | A | 1/1991 | Belisaire | |
| 4,990,721 | A | 2/1991 | Sheehan | |
| 5,132,493 | A | 7/1992 | Sheehan | |
| 5,171,164 | A | 12/1992 | O'Neil et al. | |
| 5,189,258 | A | 2/1993 | Pratesi | |
| 5,266,050 | A | 11/1993 | O'Neil et al. | |
| 5,342,994 | A | 8/1994 | Pratesi | |
| 6,043,432 | A | 3/2000 | Gretz | |
| 6,080,933 | A | 6/2000 | Gretz | |
| 6,335,488 | B1 | 1/2002 | Gretz | |
| 6,352,439 | B1 * | 3/2002 | Stark et al. | 439/142 |
| 6,380,483 | B1 | 4/2002 | Blake | |
| 6,444,907 | B1 | 9/2002 | Kiely | |
| 6,767,032 | B1 | 7/2004 | Gretz | |
| 6,916,988 | B1 * | 7/2005 | Auray et al. | 174/65 R |

* cited by examiner

FIG. 6
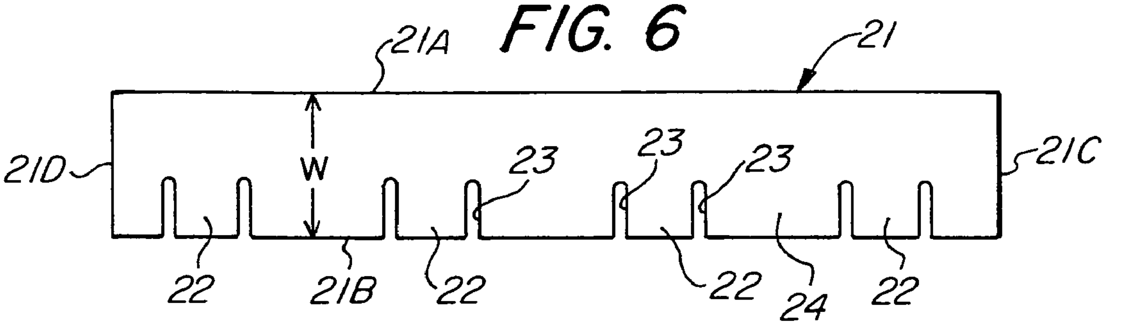
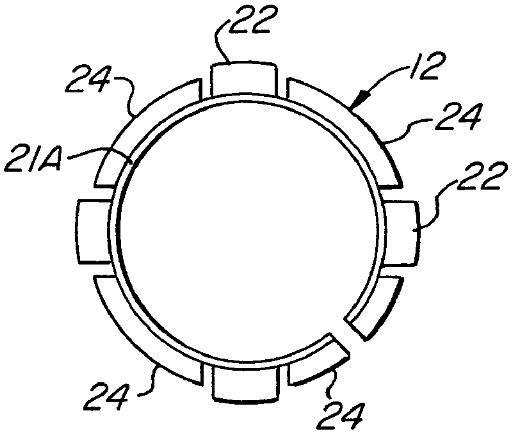
FIG. 3
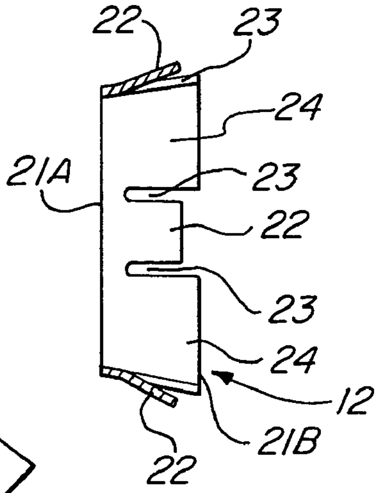
FIG. 4
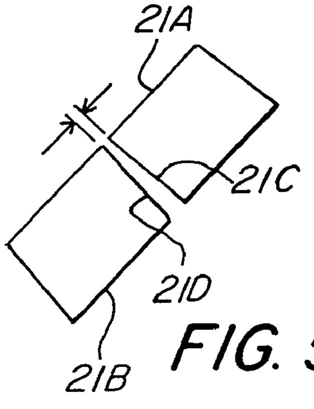
FIG. 5

ELECTRICAL CONNECTOR WITH CONICAL SPLIT SNAP RING RETAINER

RELATED APPLICATION

This application is a continuation-in-part application of a co-pending application, Ser. No. 11/028,373 filed Jan. 3, 2005 for Electrical Connector With Conical Snap Fit Retaining Ring, which claims the benefit of U.S. Provisional Application No. 60/587,121 filed Jul. 12, 2004.

FIELD OF THE INVENTION

This invention is directed to an electrical connector, and more specifically to an electrical connector assembly having a split, conically shaped, snap fit, retaining ring formed with holding and grounding tabs or tangs.

BACKGROUND OF THE INVENTION

Electrical connectors are commonly used for attaching electrical conductors, cables, wires, electric metal tubing and the like to an electric panel or box, e.g. a junction box, outlet box, switch box, fuse box and the like. Such known electrical connectors are either of the type that are secured to an electric box by a threaded lock nut or by means of a circular snap fit retaining ring of the type disclosed in U.S. Pat. Nos. 1,483,218; 2,160,353; 2,744,769; 5,189,258; 5,171,164; 5,266,050; 6,043,432; 6,080,933; 6,335,488; 6,380,483; 6,444,907 and 6,767,032.

Snap fitting connectors are of the type which includes a connector body, formed as a metal casting, e.g. a zinc casting having a circular spring metal snap fit retaining ring, e.g. as shown in one or more of the hereinbefore mentioned patents, on the end of the connector body which is adapted to be inserted through a knock-out opening of an electric box. Other snap fit connectors are known which are formed entirely of spring metal as a unitary part, as evidenced by U.S. Pat. No. 4,880,387.

While such prior known connectors can be satisfactorily used for their intended purposes, efforts are constantly being made to improve upon, simplify, and/or reduce the amount of time, effort, material or cost to fabricate such electrical connectors. The disclosure herein comprises another effort to improve and/or advance the manner of forming and/or securing an electrical connector to an electric box by a snap fit.

SUMMARY OF THE INVENTION

An object of the invention is to provide an electrical connector having an improved split, conically shaped, snap fit, retaining ring that is simple to fabricate and positive in operation.

Another object is to provide an electrical connector with a conically shaped snap fit retainer ring having a split, frustro conical configuration having an integrally formed series of holding tangs and grounding tangs.

Another object is to provide an electrical connector with a split conically shaped retainer ring supported on a complementary shaped leading end of an electrical connector.

The foregoing objects and other features and advantages are attained by an electrical connector having a connector body formed as a metal casting having a bore extending therethrough to define an inlet end portion and an outlet end portion, the outlet end portion being formed of a size and shape which permits it to be inserted through a knock out opening of an electric box. Intermediate the inlet and outlet portions, the connector body is provided with a radially outwardly projecting flange arranged to function as a stop to limit the extent to which the outlet end portion can be inserted through a knock-out hole of an electric box. Circumscribing the outlet opening of the outlet end portion is a radially outwardly extending forward flange having a diameter which can be readily inserted through a knock-out opening of an electric box.

Supported on the outlet end portion between the stop flange and the forward flange is a frustro conically shaped snap fit retaining ring. The retaining ring is preferably formed from an elongated blank of spring steel or resilient material. The blank is generally rectangular in shape having a leading edge, a trailing edge and opposed end edges. Longitudinally spaced along the trailing edge of the blank are a series of die cuts or slots disposed normal to the trailing edge to define spaced apart holding tangs with an intermediate grounding tang disposed between adjacent pairs of holding tangs. The blank so formed is rolled to form a ring that is frustro conical in cross section wherein the leading edge defines a circular configuration having a diameter which is less than the circular configuration defined by the trailing edge; and wherein the holding tangs are cantileverly bent outwardly from the outer plane surface of the blank. In the rolled or formed ring position, the resiliency of the formed frustro conical split ring enables the ring to be readily expanded for ease of placement about the outlet end portion of the connector body whereby the inherent resiliency of the ring causes the ring to contract the frustro conical ring about the outlet end of the connector body to retain the same between the stop flange and the forward flange.

In operation, the inherent resiliency of the holding tangs permits the outlet end of the connector body to be readily inserted through the knock-out opening of an electric box whereby the holding tangs are free to spring outwardly to resist any withdrawal force, and whereby the inherent resiliency of the grounding tangs defining the trailing edge of the retainer ring maintains the grounding tangs in positive engagement with the internal periphery of the knock-out hole to insure positive electric grounding between the connector and the electric box.

In another form of the invention, the outlet end of the connector body is provided with a conically shaped outer surface which slopes downwardly toward the outlet opening of the connector body that substantially complements the internal shape of the split, conically shaped, retainer ring supported thereon.

IN THE DRAWINGS

FIG. 3 is a detail front end view of the frustro-conical snap fit retaining ring.

FIG. 4 is a side view of the snap ring detail of FIG. 3.

FIG. 5 is a rotated bottom view of the snap fit ring to illustrate the split ends.

FIG. 6 is a plan view of a blank from which the retaining ring is formed.

DETAILED DESCRIPTION

Figure 1:
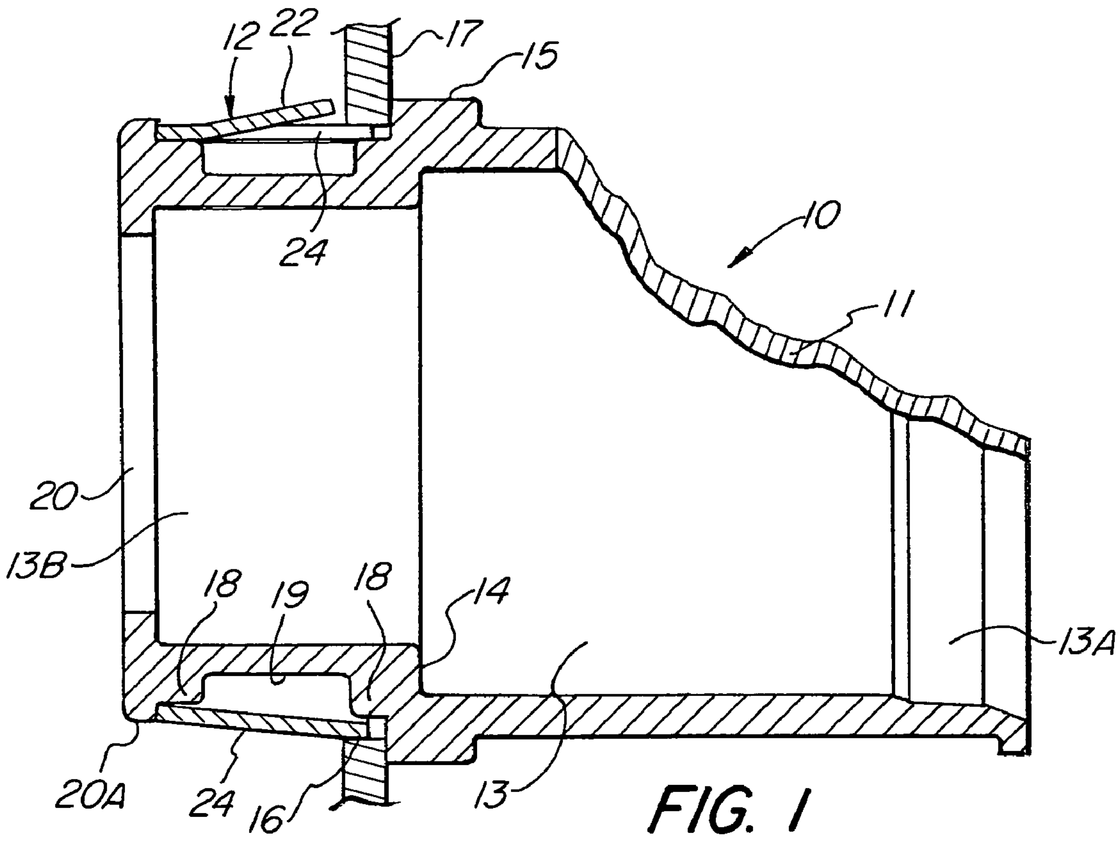
FIG. 1 illustrates a fragmentary sectional side view of an electrical connector embodying the invention as connected to an electrical box.

FIGS. 1 to 5 illustrate one embodiment of the invention. As shown, the electrical connector assembly 10 includes a connector body 11 and an improved associated snap fit retaining ring 12. The connector body 11 is generally formed as a metal casting of a suitable metallic alloy such as zinc or other suitable metallic alloy. The connector body 11 is provided with a bore 13 extending therethrough to define an inlet end portion 13A and an outlet end portion 13B. Intermediate between the inlet end portion 13A and outlet end portion 13B, the connector body 11 is provided with an internal intermediate shoulder 14 to form a stop to limit the distance the end of a cable, conduit, wire sheath or the like (not shown) may be inserted into the inlet end portion 13A of the connector body. Between the opposed end portions 13A and 13B of the connector body 11, there is provided a radially outward external flange 15 to limit the insertion of the outlet end portion 13B through a knock-out hole 16 of an electric box 17, such as a junction box, outlet box, fuse box or the like, as best seen in FIG. 1.

In the illustrated embodiment, the outer circumference of the outlet portion 13B is provided with a pair of spaced apart steps 18—18 to define therebetween a circumscribing groove or recess 19. Circumscribing the outlet opening 20 is a radially extending front or forward flange 20A which extends beyond the top of steps 18. Likewise, the stop flange 15 extends beyond its adjacent step 18.

Disposed about the outlet end 13B of the connector body 11 is a split frustro-conically formed snap fit retainer ring 12. The retainer ring 12 is preferably formed from a blank 21 of spring steel as best seen in FIG. 6. The blank 21 includes a leading edge 21A, a trailing edge 21B and opposed ends 21C and 21D. Longitudinally spaced along the trailing edge, the blank 21 is formed with a series of integrally spaced apart holding tangs 22. In the illustrated embodiment, four such holding tangs are shown. However, it will be understood that the number of holding tangs may vary from two to more than two. Holding tangs 22 are formed by cutting the blank 21 or notching the blank 21 normal to the trailing edge 21B as shown in FIG. 6 at 23. The portion of the blank 21 defined between adjacent pairs of holding tangs 22, as will be described hereinafter, will define a grounding tang 24. As noted in FIG. 6, the width W of the blank 21 is substantially equal to the distance between the stop flange 15 and the outlet or forward flange 20A.

Figure 2:
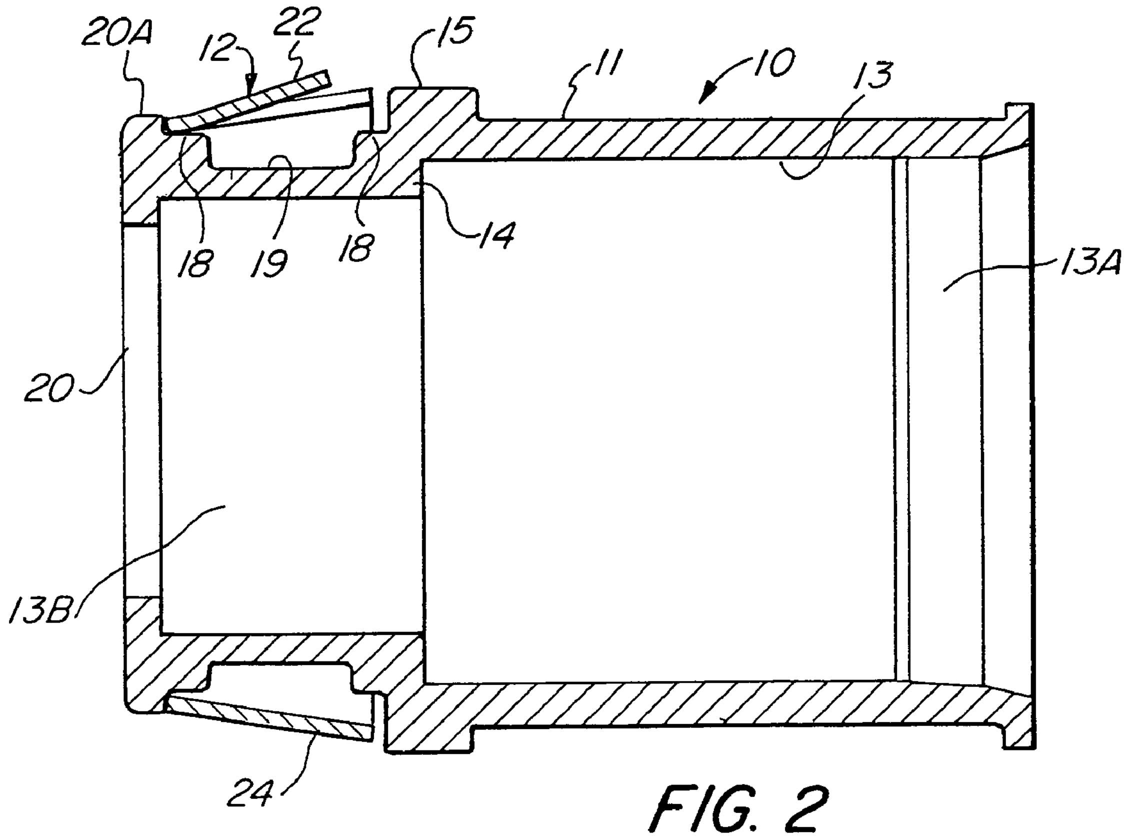
FIG. 2 is a sectional side view of an electrical connector and associated frustro-conical snap fit retainer ring.

In accordance with this invention, the blank 21 formed, as shown in FIG. 6, is rolled into a ring to define a frustro conical shape as best seen in FIGS. 1, 2 and 4; wherein the leading edge 21A defines the smaller circumference of the retainer ring 12 and the trailing edge 21B defines the larger circumference of the retainer ring 12. Also, as shown in FIGS. 1, 2 and 4, the holding tangs 22 are bent outwardly from the outer surface of the blank so that the trailing edge of the holding tangs 22 is displaced or positioned inwardly from the trailing edge of the respective grounding tangs 24, as noted in FIGS. 1, 2 and 4.

The retainer ring 12, when formed as described, is fitted onto the outlet end 13B of the connector body 11 so as to rest upon the steps 18—18 between the stop flange 15 and the outlet flange 20A. The split formed between the opposed ends 21C, 21D facilitates positioning the retainer ring 12 onto the outlet end 13B of the connector body 11, and is retained thereon between flanges 15 and 20A by the inherent resiliency of the ring 12.

With the construction described, the connector assembly 10 can be readily attached to an electric box 17 by simply inserting the outlet end 13B of the connector assembly 10 through a knock out opening or hole 16 whereby the holding tangs are depressed until the stop flange 15 engages the wall of the electric box 17, at which time the holding tangs 22 spring outwardly due to the inherent resiliency thereof, to prohibit the connector assembly 10 from any unintentional separation from the electric box. Also, as noted in FIG. 1, the grounding tangs 24, due to the inherent resiliency of the blank 21 and its conical configuration, are biased toward and engaged in direct contact with the inner periphery of the knock out hole 16 to effect a very positive electrical grounding effect between the connector assembly and the electric box 17.

It will be understood that the connector body 11 may be provided with a suitable means (not shown), but common with connectors, for securing an electrical cable, wire or electrical conductor to the connector body to prohibit the electrical conductor or wires that are intended to extend through the connector body from becoming separated therefrom.

Figure 7:
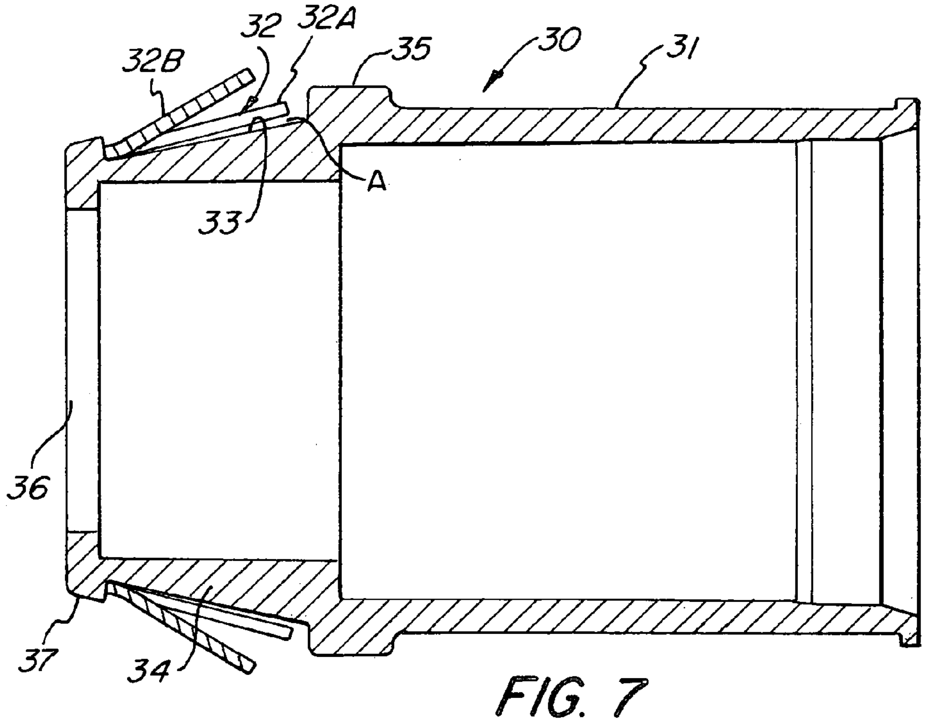
FIG. 7 is a sectional side view of a modified form of the invention.
Figure 8:
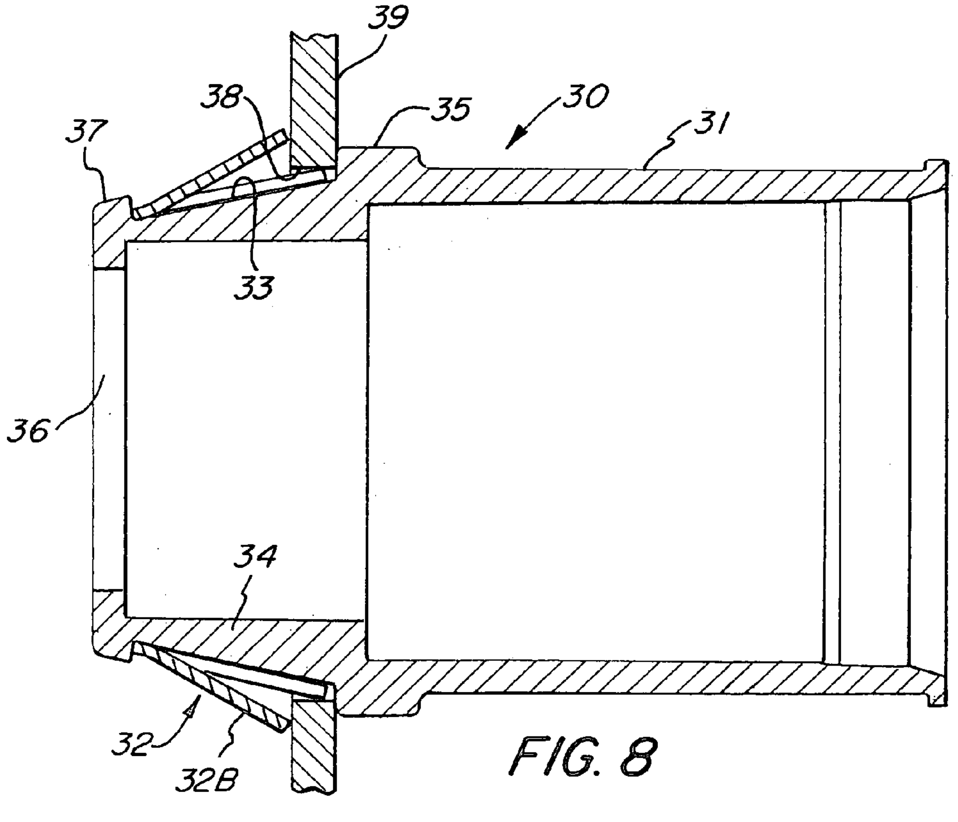
FIG. 8 is a sectional side view similar to the embodiment of FIG. 7 to illustrate the connector assembly in an operative connected position with an associated electrical box.

FIGS. 7 and 8 illustrate a modified form of the invention. In this form of the invention, the connector assembly 30 includes a connector body 31 and an associated snap ring retainer 32. The connector body 31 is similar to the connector body 13 described with respect to the embodiment of FIGS. 1 to 6, except that the outer surface 33 of the leading or outlet end 34 is conically shaped. As shown, the outer surface 33 slopes downwardly from the radially outwardly extending stop flange 35 toward the outlet opening 36. Circumscribing the outlet opening is a radially outwardly extending leading end flange 37.

Disposed on the outlet end 34 of the connector body 31 is a resilient conical or frustro conical split retainer ring 32. The retainer ring 32 is similar to that hereinbefore described retainer ring 12 as disclosed in FIGS. 3 to 6, and which description need not be repeated.

As best seen in FIGS. 7 and 8, the retainer ring 32 is disposed about the outer sloping surface 33 of the outlet or leading end 34 of the connector body 31 between the forward flange 37 and the stop flange 35. The inherent resiliency of the spring steel retainer ring 32 retains the retainer ring 32 on the outlet end 34 between flanges 35 and 37.

As noted in FIG. 7, in the inoperative or rest position, the grounding tangs 32A define a slight angle A between the internal surface of the ring or tang 32A and the adjacent outer surface 33 of the outlet end 34. Thus, as the connector assembly 30 described is inserted through the knock out holes 38 of an electrical box 39, the grounding tangs 32A are slightly compressed as noted in FIG. 8 to close angle A. Due to the inherent resiliency of the grounding tangs 32A, the grounding tangs are positively biased toward the inner periphery of the knock out hole when the connected assembly 30 is connected to an electrical box or panel 39 to provide for a very positive electrical ground.

The frustro conical retaining rings 12 and 30 as described herein can readily compensate for any variance in tolerance in the size of the knock out holes of an electric box within a given range of acceptable tolerances. Thus, where the tolerance of a knock out hole can vary even between various knock out holes in the same box, the retainer ring, as described herein, enables the respective grounding tangs 32A to be effectively self adjusting to a given knock out hole so as to assure a positive grounding effect. The slight angle A enables the grounding tang 32A to flex an amount sufficient to accommodate for any slight variance in the size of a knock out hole.

The holding tangs 22 and 32B of the respective rings 12 and 32 secure the connector assemblies 10 and 30 to its corresponding electrical box 17 and 39.

While the present invention has been described with respect to the illustrated embodiment, it will be understood that various modifications may be made without departing from the spirit or scope of the invention. For example, the outlet end portion can be formed without the recess 19 and/or steps 18.

What is claimed is:

1. A connector assembly comprising:

a connector body having an inlet end and an outlet end, a bore extending through said inlet end and outlet end, a stop flange circumscribing said connector body between said outlet end and inlet end, a radially outwardly forward flange circumscribing the opening of said outlet end, said outlet end having an outer surface that slopes downwardly from said stop flange toward said forward flange, and a resilient split retainer ring disposed about said outlet end between said stop flange and forward flange, said retainer ring having a frustro conical configuration which substantially complements said outer surface of said outlet end, said retainer ring having a series of holding tangs formed out of the surface of said retainer ring, and a series of grounding tangs disposed between adjacent pairs of said holding tangs.

2. A connector assembly as defined in claim 1 wherein said grounding tangs are normally in co-planar relationship to the surface of said retainer ring.

3. A connector assembly as defined in claim 2 wherein said holding tango are normally cantilevered outwardly from the surface of said retainer ring at a greater angle than that of the grounding tangs.

4. A connector assembly as defined in claim 1 whereby the sloping outer surface of said outlet end and the complementary sloping inner surface of said retaining ring normally defines a slight angle therebetween.

* * * * *